(12) United States Patent
Polus (10) Patent No.: US 11,367,893 B2
(45) Date of Patent: Jun. 21, 2022

(54) MULTIFUNCTIONAL BATTERY PACKAGING AND INSULATION

(71) Applicant: The Boeing Company, Chicago, IL (US)

(72) Inventor: Jeffrey E. Polus, Hillsboro, IL (US)

(73) Assignee: The Boeing Company, Chicago, IL (US)

( * ) Notice: Subject to any disclaimer, the term of this patent is extended or adjusted under 35 U.S.C. 154(b) by 484 days.

(21) Appl. No.: 16/183,093

(22) Filed: Nov. 7, 2018

(65) Prior Publication Data

US 2020/0144658 A1    May 7, 2020

(51) Int. Cl.
| | |
|---|---|
| *H01M 10/0525* | (2010.01) |
| *H01M 10/613* | (2014.01) |
| *H01M 10/6567* | (2014.01) |
| *H01M 50/20* | (2021.01) |

(52) U.S. Cl.
CPC ..... *H01M 10/0525* (2013.01); *H01M 10/613* (2015.04); *H01M 10/6567* (2015.04); *H01M 50/20* (2021.01)

(58) Field of Classification Search
CPC ......... H01M 10/0525; H01M 10/6557; H01M 50/20; H01M 50/204; H01M 50/222; H01M 50/22
See application file for complete search history.

(56) References Cited

U.S. PATENT DOCUMENTS

| | | | |
|---|---|---|---|
| 5,167,271 A | * | 12/1992 | Lange ............... B22D 19/14 164/103 |
| 6,479,185 B1 | | 11/2002 | Hilderbrand et al. |
| 2005/0118392 A1 | * | 6/2005 | Millard .............. C04B 35/6264 428/131 |
| 2012/0003508 A1 | | 1/2012 | Narbonne et al. |

(Continued)

FOREIGN PATENT DOCUMENTS

| | | |
|---|---|---|
| CN | 108736102 | 11/2018 |
| DE | 102009001592 | * 9/2010 |
| WO | WO 2015/179625 | 11/2015 |

OTHER PUBLICATIONS

"Ceramic matrix composite—Wikipedia", May 28, 2016 (May 28, 2016), Retrieved from the Internet: URL:<https://en.wikipedia.org/w/index.php?title=Ceramic matrix composite&oldid=722547687>, [retrieved on Jul. 14, 2017].

*Primary Examiner* — Ula C Ruddock
*Assistant Examiner* — Thomas H. Parsons
(74) *Attorney, Agent, or Firm* — Haynes and Boone, LLP (57) ABSTRACT

Systems, methods, and apparatus for multifunctional battery packaging and insulation are disclosed. In one or more embodiments, a battery pack comprises a plurality of battery cells. The battery pack further comprises a block comprising a plurality of recesses formed within the block. In one or more embodiments, each of the recesses respectively houses one of the battery cells within the block. In at least one embodiment, the block comprises a low density ceramic fiber reinforced foam that is porous such that a gas or liquid (Continued)

may pass through the block to cool the battery pack. In one or more embodiments, at least a portion of the block is covered with a ceramic matrix composite (CMC) material comprising a ceramic slurry composite pre-impregnated (prepreg) with fibers. In some embodiments, the CMC material is cured via kiln firing the block.

20 Claims, 9 Drawing Sheets

(56) References Cited

U.S. PATENT DOCUMENTS

| | | | |
|---|---|---|---|
| 2016/0218336 A1* | 7/2016 | Herrmann | H01M 50/209 |
| 2017/0214103 A1* | 7/2017 | Onnerud | H01G 11/66 |
| 2018/0309107 A1* | 10/2018 | Widener | H01M 50/446 |

* cited by examiner

MULTIFUNCTIONAL BATTERY PACKAGING AND INSULATION

FIELD

The present disclosure relates to batteries. In particular, the present disclosure relates to multifunctional battery packaging and insulation.

BACKGROUND

Present day lithium ion battery cells are susceptible to thermal runaway. This presents a considerable safety issue in the form of fire. Likewise, one battery cell exotherming (i.e. experiencing thermal runaway) can cause the temperature in the adjacent battery cells to increase, thus causing a cascading effect of exotherming battery cells among an entire array of battery cells. In addition, it is preferred to keep the battery cells at a constant temperature throughout their life cycle to ensure peak performance and to prevent premature battery cell failure.

Present solutions include either no insulation or encasing the battery cell array in a block of high density polyurethane (HDPE) or other similar plastic materials. While this solution attempts to prevent the cascading effect of individual battery cell runaway, it is prohibitively heavy and does not allow for adequate cooling due to the impervious nature of the HDPE. In essence, the battery cells are wrapped in a solid cocoon of non-porous polyethylene thermoplastic, which acts to contain heat rather than to dissipate it.

In light of the foregoing, there is a need for an improved battery cell packaging and insulation design.

SUMMARY

The present disclosure relates to a method, system, and apparatus for multifunctional battery packaging and insulation. In one or more embodiments, a battery pack comprises a plurality of battery cells. The battery pack further comprises a block comprising a plurality of recesses formed within the block, where each of the recesses respectively houses one of the battery cells within the block. In one or more embodiments, the block comprises a low density ceramic fiber reinforced foam that is porous such that a gas or liquid may pass through the block to cool the battery cells.

In one or more embodiments, at least one of the battery cells is a lithium-ion battery cell, a nickel-cadmium battery cell, a nickel-zinc battery cell, and/or a nickel-metal hydride battery cell. In some embodiments, the lithium-ion battery cell is a lithium cobalt oxide battery cell, a lithium manganese oxide battery cell, a lithium iron phosphate battery cell, a lithium nickel manganese cobalt oxide battery cell, a lithium nickel cobalt aluminum oxide battery cell, a lithium titanate battery cell, or a lithium-sulfur battery cell.

In at least one embodiment, the low density ceramic fiber reinforced foam is a low density oxide ceramic fiber reinforced foam. In some embodiments, the low density ceramic fiber reinforced foam comprises alumina-borosilicate.

In one or more embodiments, at least a portion of a surface of the block is local hardened.

In at least one embodiment, at least a portion of a surface of the block is covered with a ceramic matrix composite (CMC) material. In one or more embodiments, the ceramic matrix composite (CMC) material comprises a ceramic slurry composite pre-impregnated (prepreg) with fibers. In some embodiments, the ceramic matrix composite material (CMC) is cured via firing the block in a kiln.

In one or more embodiments, an interior surface of at least one of the recesses of the block is coated with the ceramic matrix composite (CMC) material.

In at least one embodiment, the block is configured to pass the gas or the liquid in a zig-zag fashion within an interior of the block. In some embodiments, at least one cooling hole is machined or formed within the block such that a gas or liquid may pass through the block via the at least one cooling hole.

In one or more embodiments, a system for cooling a battery pack comprises the battery pack comprising a plurality of battery cells and a block comprising a plurality of recesses formed within the block, where each of the recesses respectively houses one of the battery cells within the block. In one or more embodiments, the block comprises a low density ceramic fiber reinforced foam that is porous such that a gas or liquid may pass through the block. The system further comprises a pump to pump the gas or the liquid through the block to cool the battery cells within the block.

In at least one embodiment, the pump is configured to pump the gas or the liquid into a face side or into an edge side of the block. In one or more embodiments, the pump is configured to pump the gas or the liquid into at least one cooling hole, which is machined or formed within the block. In some embodiments, the block is configured to allow the gas or the liquid pass in a zig-zag fashion within an interior of the block.

In one or more embodiments, a method for cooling a battery pack comprises pumping, via a pump, a gas or liquid through a block of the battery pack to cool a plurality of battery cells within the battery pack. In at least one embodiment, a plurality of recesses is formed within the block, and each of the recesses respectively houses one of the battery cells within the block. In some embodiments, the block comprises a low density ceramic fiber reinforced foam that is porous such that the gas or the liquid may pass through the block.

In at least one embodiment, a method of manufacturing a battery pack, comprises forming a block comprising a plurality of recesses configured to receive a plurality of battery cells, where the block comprises a low density ceramic fiber reinforced foam that is porous such that a gas or liquid may pass through the block. The method further comprises covering at least a portion of a surface of the block with a ceramic matrix composite (CMC) material. Also, the method comprises firing the block in a kiln to cure the CMC material. Further the method comprises disposing one of the battery cells within each of the recesses within the block.

In one or more embodiments, the method further comprises machining or forming at least one cooling hole within the block to allow for a gas or liquid to pass through the block.

In at least one embodiment, the method further comprises forming the block such that the block is configured to pass the gas or the liquid in a zig-zag fashion within an interior of the block.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for multifunctional battery packaging and insulation.

As previously mentioned above, present day lithium ion battery cells are susceptible to thermal runaway. This presents a considerable safety issue in the form of high temperatures and fire. Likewise, if one battery cell experiences thermal runaway (which can be caused by a short within the battery cell), the heat and fire produced from the thermal runaway can cause the temperature in the adjacent battery cells to increase. This increase in temperature in the adjacent battery cells can cause a cascading effect of thermal runaway within the entire array of battery cells. In addition, it is preferred to maintain the battery cells at a constant temperature throughout their life cycle to ensure peak performance of the battery cells and to prevent premature battery cell failure.

Present solutions include either no insulation or encasing the battery cell array in a block of high density polyurethane (HDPE) or other similar plastic materials. While this solution attempts to prevent the cascading effect of individual battery cell runaway, it is prohibitively heavy and does not allow for adequate cooling due to the impervious nature of the HDPE. In essence, the battery cells are wrapped in a solid cocoon of non-porous polyethylene thermoplastic, which acts to contain heat (i.e. acts to insulate the heat) rather than to dissipate it. The block of HDPE (or other similar plastic material) is incapable of withstanding the temperatures exhibited during thermal runaway that can reach 1,100 degrees Fahrenheit.

The present disclosure teaches a battery pack design comprising a battery cell array packaged within a block of low density ceramic fiber reinforced foam (e.g., low density oxide ceramic fiber reinforced foam) (e.g., comprising alumina-borosilicate). The low density ceramic fiber reinforced foam has a density range of approximately 8 to 30 pounds per cubic foot (pcf), and comprises approximately 95% to 98% air by volume. The block may be bare mineral, or local surface hardened, or even covered selectively in a ceramic slurry composite prepreg (e.g., a ceramic slurry pre-impregnated with fibers) and subsequently kiln fired. In one or more embodiments, a cooling gas (e.g., air) or liquid (e.g., water or coolant) may be pumped into (and/or forced though) the porous block (e.g., through the open cell foam of the block) of the disclosed battery pack to help maintain more of a constant temperature battery cell operating range.

The disclosed battery pack design of encasing a battery cell array within a block of low density ceramic fiber reinforced foam provides several advantages. Firstly, the design allows for isolation of the battery cells such that, in the event an individual battery cell experiences thermal runaway, the fire is contained within the battery cell and the heat produced by that battery cell does not heat any adjacent battery cells. Secondly, the porous nature of the block of the design allows for cooling of the battery cells via a forced air exchange applied to the block. Thirdly, the disclosed battery pack design weighs (e.g., approximately 8 to 20 pounds per cubic foot) much less than conventional battery pack designs employing HDPE (e.g., approximately 50 pounds per cubic foot). Fourthly, the disclosed battery pack design can withstand much higher temperatures (e.g., can withstand temperatures greater than 2000 degrees Fahrenheit) than conventional battery pack designs employing HDPE, which is incapable of withstanding typical temperatures exhibited during runaway that can reach 1,100 degrees Fahrenheit.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to battery packs, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

Figure 1:
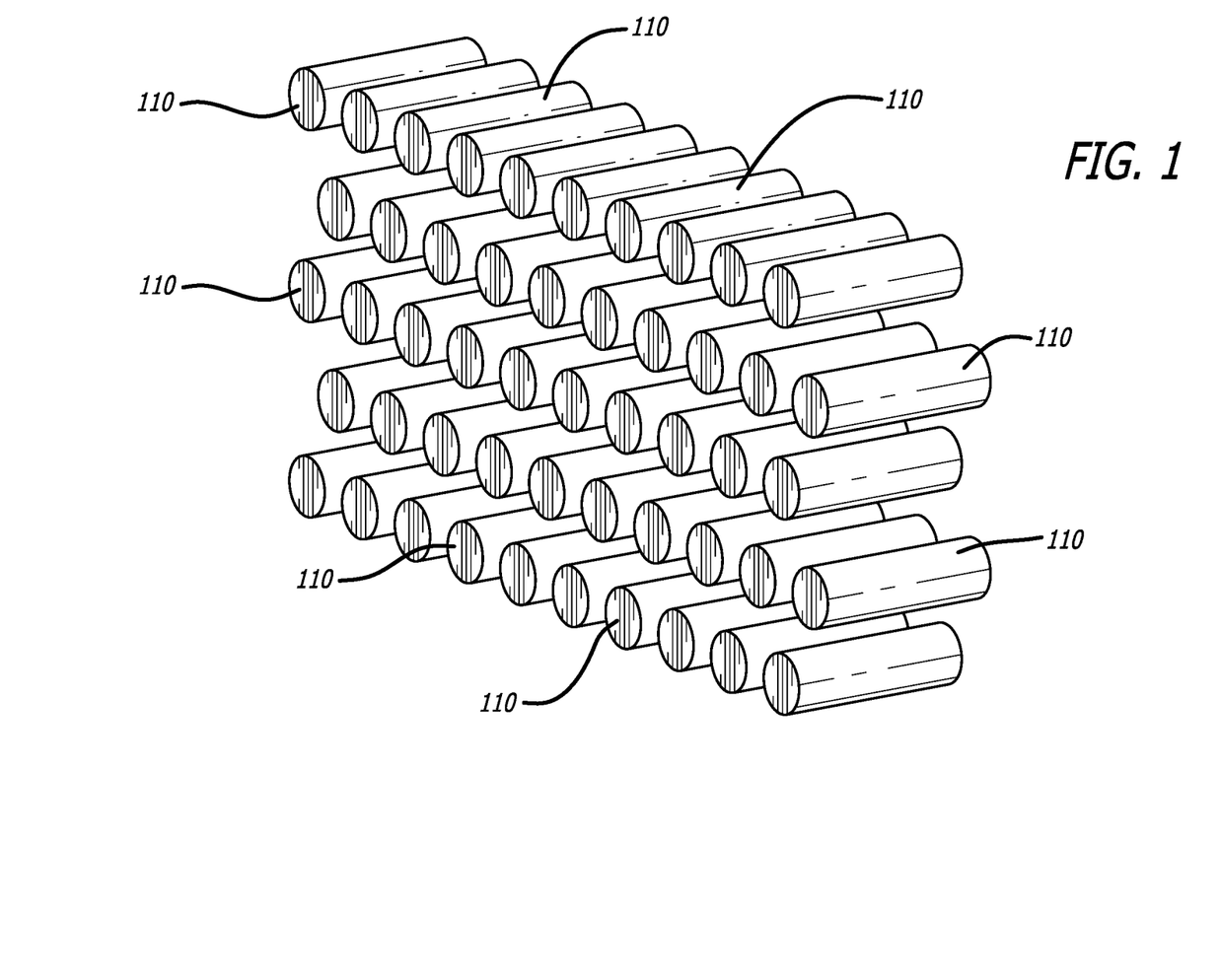
FIG. 1 is a diagram showing a plurality of battery cells employed for the disclosed battery pack, in accordance with at least one embodiment of the present disclosure.

FIG. 1 is a diagram showing a plurality of battery cells 110 employed for the disclosed battery pack 310 (refer to FIG. 3), in accordance with at least one embodiment of the present disclosure. In this figure, the battery cells 110 are shown to be cylindrical in shape. However, it should be noted that in other embodiments, the battery cells 110 may be of various different shapes than the cylindrical shape as is depicted in FIG. 1.

Various different types of battery cells may be employed for the battery cells 110 of the disclosed battery pack 310 including, but not limited to, lithium-ion battery cells, nickel-cadmium battery cells, nickel-zinc battery cells, and/or nickel-metal hydride battery cells. When lithium-ion battery cells are employed for the battery cells 110, various different types of lithium-ion battery cells may be employed for the battery cells 110 of the disclosed battery pack 310 including, but not limited to, lithium cobalt oxide battery cells, lithium manganese oxide battery cells, lithium iron phosphate battery cells, lithium nickel manganese cobalt oxide battery cells, lithium nickel cobalt aluminum oxide battery cells, lithium titanate battery cells, or lithium-sulfur battery cells.

Figure 2:
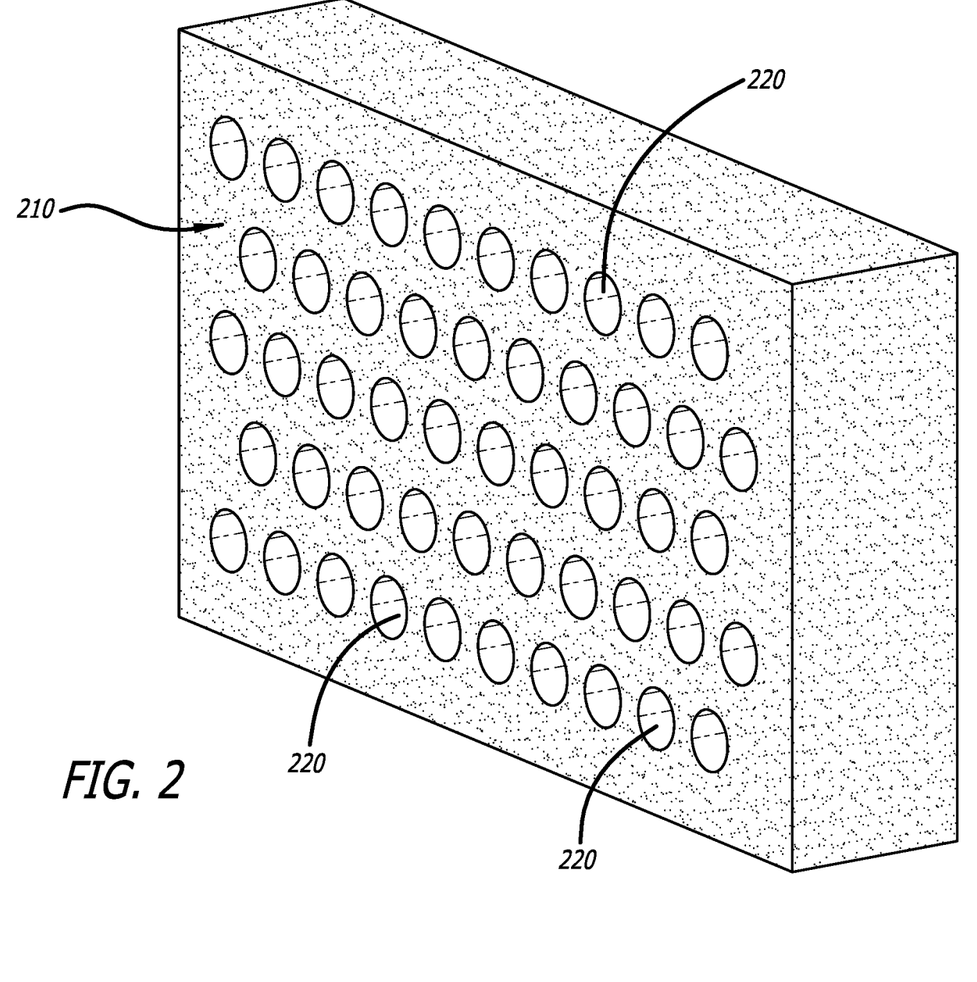
FIG. 2 is a diagram showing a block employed for the disclosed battery pack, in accordance with at least one embodiment of the present disclosure.

FIG. 2 is a diagram showing a block 210 employed for the disclosed battery pack 310 (refer to FIG. 3), in accordance with at least one embodiment of the present disclosure. In this figure, the block 210 is shown to be formed to comprise a plurality of recesses 220 configured to receive the plurality of battery cells 110. For the disclosed battery pack 310, a single battery cell 110 is disposed (e.g., inserted) into each recess 220 of the block 210. As such, the recesses 220 are formed to be complimentary in shape and size to the battery cells 110.

The block 210 is manufactured from a low density ceramic fiber reinforced foam, such as a low density oxide ceramic fiber reinforced foam. In one or more embodiments, the low density ceramic fiber reinforced foam comprises alumina-borosilicate. In at least, one embodiment, the low density ceramic fiber reinforced foam is a Boeing Rigid Insulation (BRI) material. The foam is porous (e.g., an open cell foam) such that a gas (e.g., air) or a liquid (e.g., water or a coolant) may pass through the block 210 to cool the battery cells 110.

In one or more embodiments, the block 210 may also be formed to allow a gas or a liquid to pass (e.g., flow) in a predefined fashion (e.g., a zig-zag fashion, refer to FIG. 7) within the interior (or manifold) of the block 210. In some embodiments, the block 210 may be formed to comprise at least one cooling hole (e.g., refer to cooling holes 710, 740 of block 730 of FIG. 7) (or slot) on a side (e.g., refer to an edge side 420*a-d* or face side 430*a,b*, of FIG. 4) of the block 210 such that a liquid or gas may pass through the block 210 via the cooling hole. Also, at least one cooling hole (or slot) may be machined (instead of formed) on a side of the block 210 to allow for a liquid or gas may pass through the block 210 via the cooling hole.

In one or more embodiments, at least a portion of the surface (which may include the surface of the interior of at least one recess 220) of the block 210 is covered with a ceramic matrix composite (CMC) material (e.g., a ceramic slurry composite pre-impregnated (prepreg) with fibers, such as a ceramic slurry mix with 3M Nextel 312 ceramic fibers). As such, the block 210 may be covered by the CMC material in a number of different ways to control gas or liquid flow. For example, but not limited by these examples, only the surface of one side of the block 210 may be covered with the CMC material, only the surface of the interior of the recesses 220 of the block 210 may be covered with the CMC material, only the surface of the interior of some of the recesses 220 of the block 210 may be covered with the CMC material, only the surface of one side of the block and the surface of the interior of the recesses 220 of the block 210 may be covered with the CMC material, or only the surface of two sides of the block and the surface of the interior of some of the recesses 220 of the block 210 may be covered with the CMC material. The CMC material is cured by firing the block 210 in a kiln after the CMC material is applied to the block 210.

In one or more embodiments, at least one cooling hole (and/or slot) may be machined into at least one of the recesses 220 of the block 210 to enhance the heat exchange and/or cooling function. It should be noted that the cooling hole(s) (and/or slot(s)) may be machined within recesses 220 that have their interior surface covered with the CMC material, which has already been cured, and/or within recesses 220 that do not have their interior surface covered with the CMC material.

Then, the battery cells 110 are disposed within the recesses 220 of the block.

In other embodiments, at least a portion of the surface (which may include the surface of the interior of at least one recess 220) of the block 210 is local hardened. For these embodiments, after at least a portion of the surface of the block 210 is local hardened, the battery cells 110 are disposed within the recesses 220 of the block.

Figure 3:
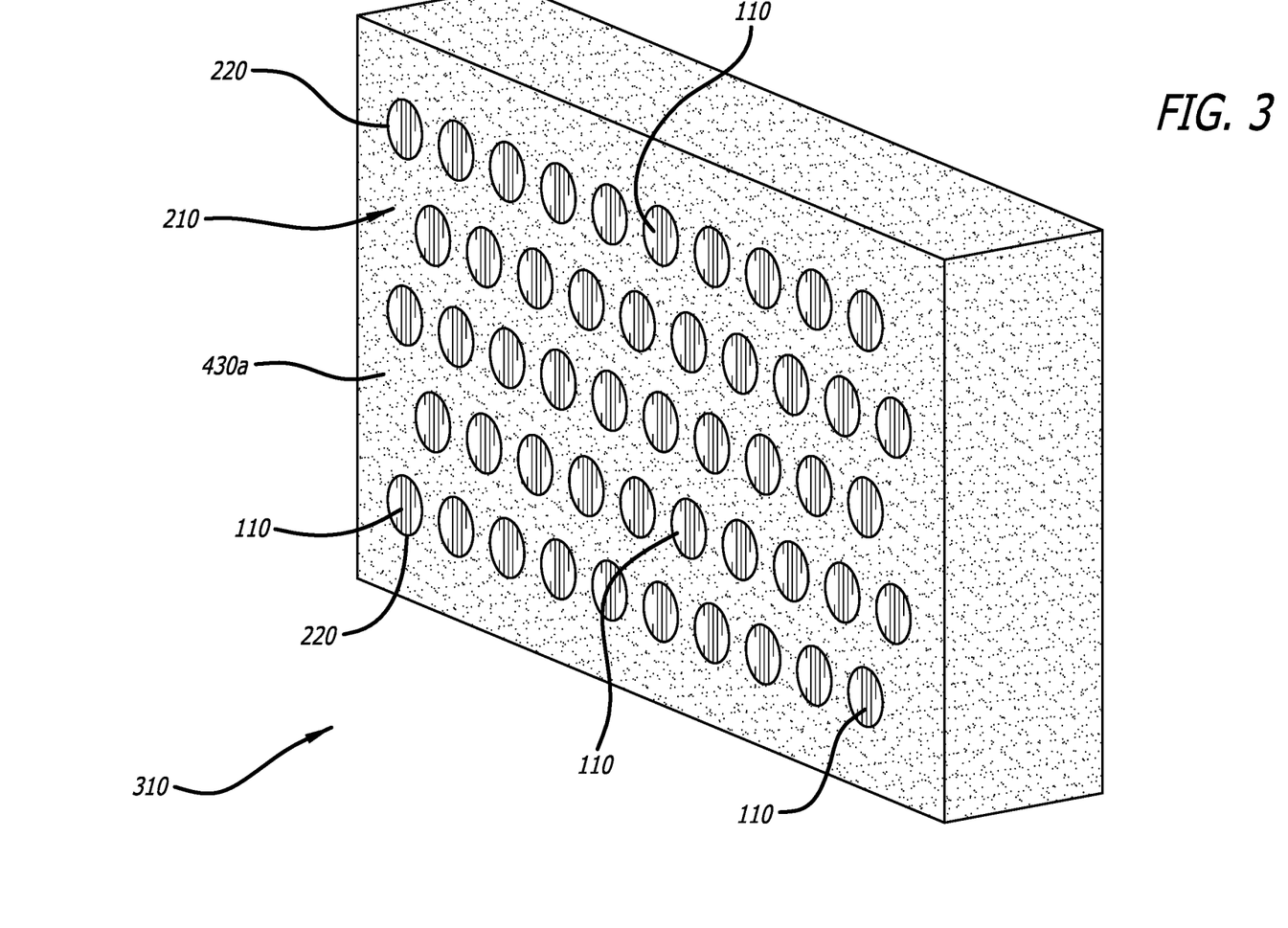
FIG. 3 is a diagram showing the fully constructed disclosed battery pack, in accordance with at least one embodiment of the present disclosure.

FIG. 3 is a diagram showing the fully constructed disclosed battery pack 310, in accordance with at least one embodiment of the present disclosure. In this figure, each of the recesses 220 of the block 210 houses one of the battery cells 110 within the block 210. As is shown in this figure, the top side of each of the battery cells 110 is flush with the surface of the first face side 430*a* of the block 210, and each of the battery cells 110 fits into a respective recess 220 such that there are no gaps in between each of the battery cells 110 and its respective recess 220.

Figure 4:
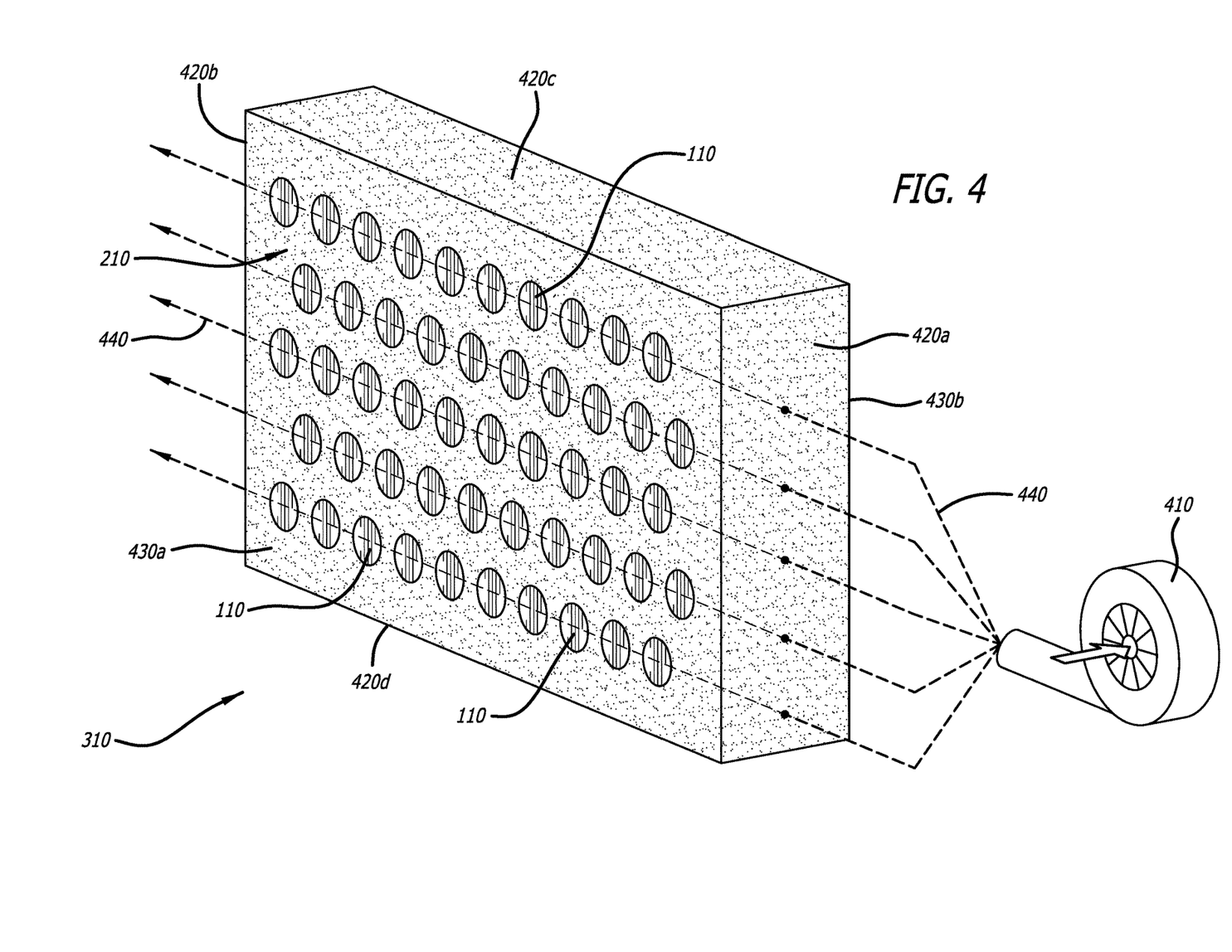
FIG. 4 is a diagram showing a gas pumped by a pump into an edge side of the block of the disclosed battery pack, in accordance with at least one embodiment of the present disclosure.

FIG. 4 is a diagram showing a gas 440 pumped by a pump 410 into an edge side (e.g., a first edge side) 420*a* of the block 210 of the disclosed battery pack 310, in accordance with at least one embodiment of the present disclosure. In this figure, a pump (e.g., a blower) 410 is shown to be pumping a gas (e.g., air) into the block 210 in order to cool the battery cells 110 housed within the block 210. It should be noted that although the pump 410 is depicted as a blower in FIG. 4, in various other embodiments, various other different types of pumps may be employed for the pump 410 of the disclosed system including, but not limited to, a liquid pump (e.g., a water pump). In addition, in other embodiments, the pump 410 may pump a liquid (e.g., water or coolant) into the block 210 rather than a gas 440 as is illustrated in FIG. 4.

In FIG. 4, the pump 410 is shown to be pumping a gas 440 into a first edge side 420*a* of the block 210. The pumped gas 440 travels within the porous material of the block 210, travels past the battery cells 110 to cool the battery cells 110 and exits out of the second edge side 420*b* of the block 210. It should be noted that in other embodiments, the pump 410 may pump a gas 440 (or liquid) into various different sides of the block 210 other than the first edge side 420*a* of the block 210 as is depicted in FIG. 4. The various other different sides of the block 210 that the gas 440 may be pumped into are the second edge side 420*b*, the top edge side 420*c*, the bottom edge side 420*d* (refer to FIG. 5), the first face side 430*a* (refer to FIG. 7), and the second face side 430*b*.

Figure 5:
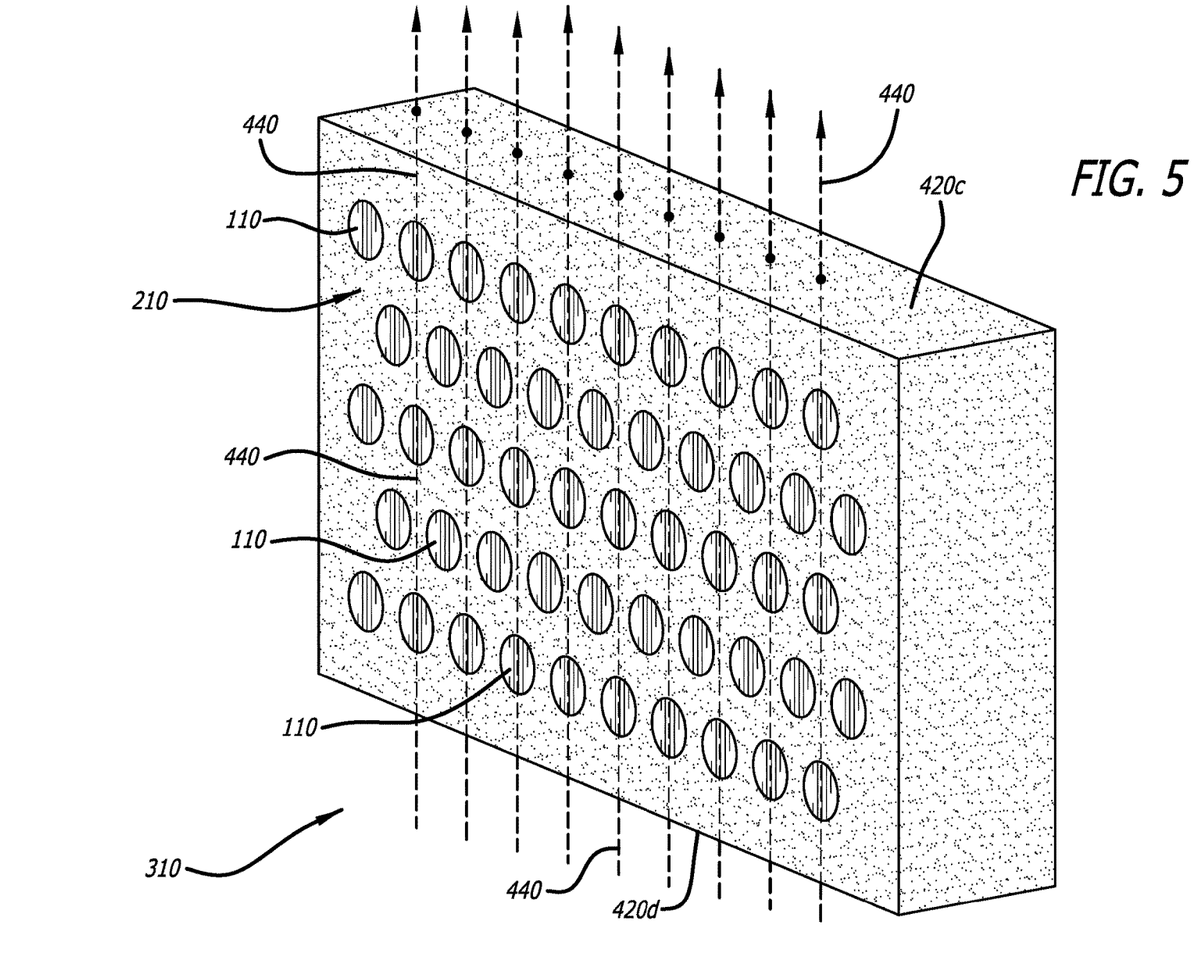
FIG. 5 is a diagram showing a gas pumped into another edge side of the block of the disclosed battery pack, in accordance with at least one embodiment of the present disclosure.

FIG. 5 is a diagram showing a gas 440 pumped into another edge side (e.g., a bottom edge side) 420*d* of the block 210 of the disclosed battery pack 310, in accordance with at least one embodiment of the present disclosure. It should be noted that although FIG. 5 (as well as FIGS. 6 and 7) does not specifically show a pump 410 (refer to FIG. 4) pumping the gas 440 into the block 210, it is understood that a pump 410 is being used to pump the gas 440. In FIG. 5, the gas 440 is pumped into a bottom edge side 420d of the block 210. The pumped gas 440 travels within the porous material of the block 210, travels past the battery cells 110 to cool the battery cells 110 and exits out of the top edge side 420c of the block 210.

Figure 6:
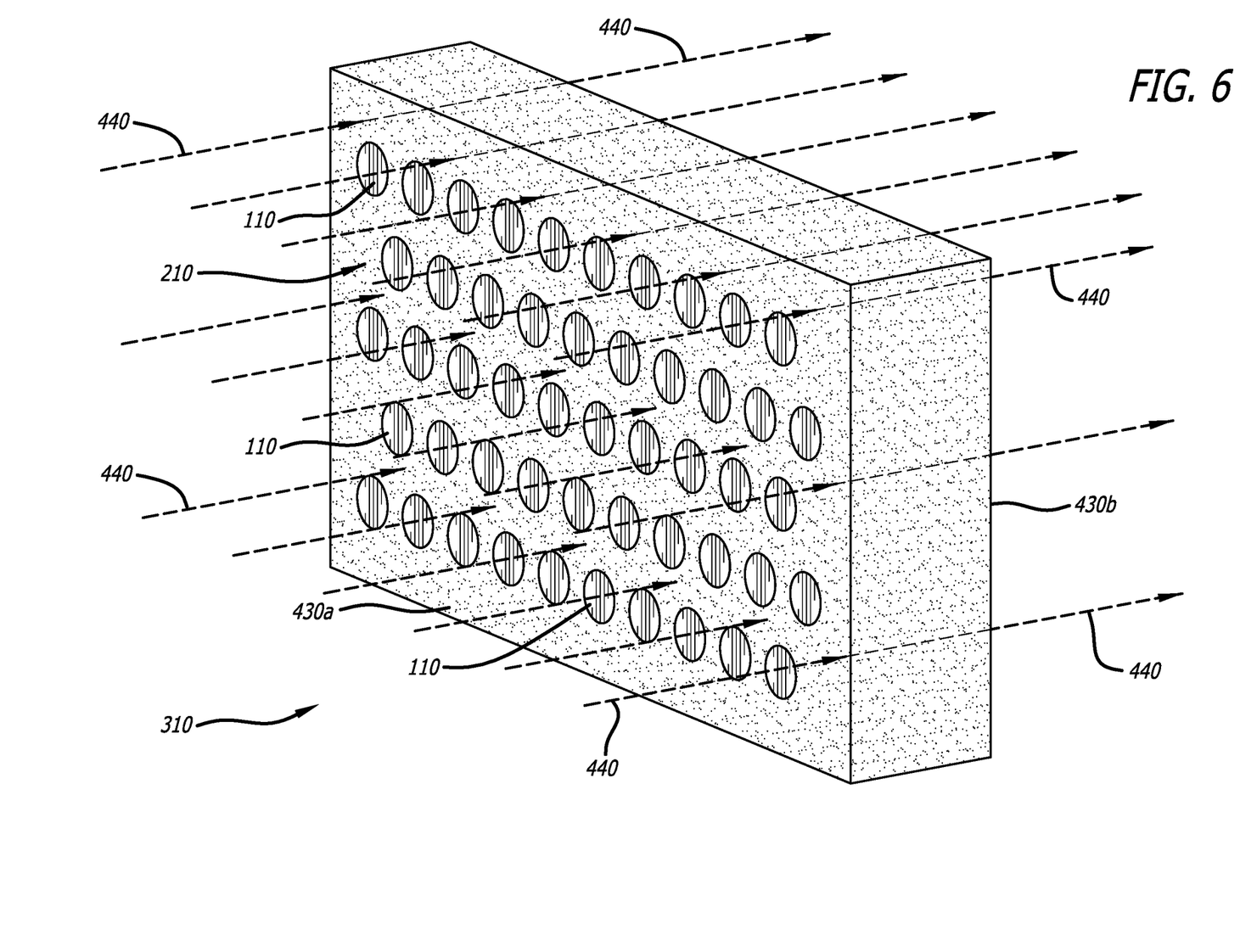
FIG. 6 is a diagram showing a gas pumped into a face side of the block of the disclosed battery pack, in accordance with at least one embodiment of the present disclosure.

FIG. 6 is a diagram showing a gas 440 pumped into a face side (e.g., a first face side 430a) of the block 210 of the disclosed battery pack 310, in accordance with at least one embodiment of the present disclosure. In FIG. 6, the gas 440 is pumped into a first face side 430a of the block 210. The pumped gas 440 travels within the porous material of the block 210, travels past the battery cells 110 to cool the battery cells 110 and exits out of the second face side 430b of the block 210.

Figure 7:
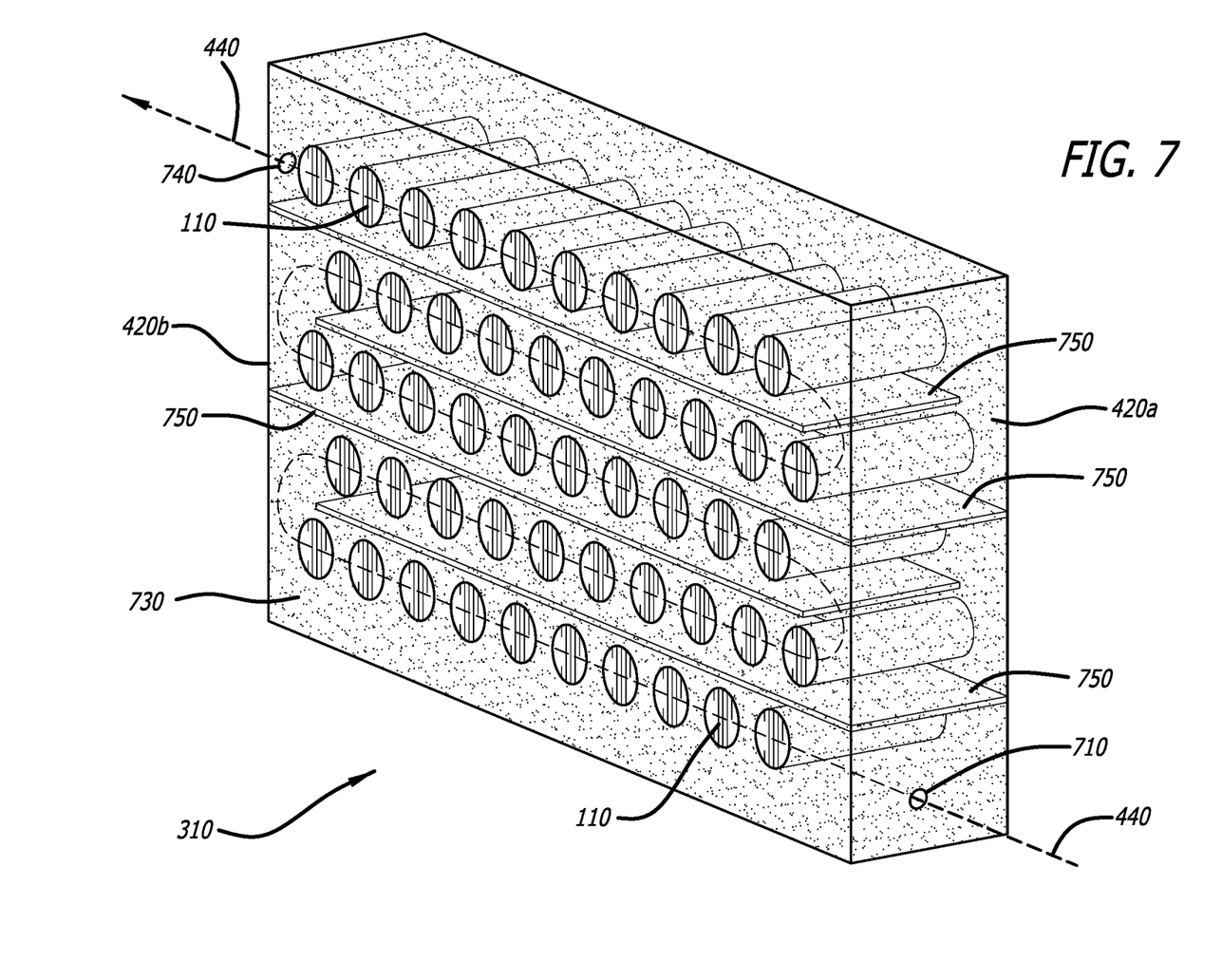
FIG. 7 is a diagram showing a gas pumped into a cooling hole of the block of the disclosed battery pack, in accordance with at least one embodiment of the present disclosure.

FIG. 7 is a diagram showing a gas 440 pumped into a cooling hole 710 of the block 730 of the disclosed battery pack 720, in accordance with at least one embodiment of the present disclosure. The block 730 for the battery pack 720 of this figure is formed to allow a gas 440 (or a liquid) to pass (e.g., flow) in a predefined zig-zag fashion within the interior (or manifold) of the block 730. In particular, solid barriers 750 are formed within the porous block such that a gas (or liquid) will be forced to flow within the interior of the block 730 in a zig-zag fashion.

Also shown in FIG. 7, cooling holes 710, 740 are formed (or alternatively machined) on the first edge side 420a and the second edge side 420b of the block 730. The gas 440 is pumped into the block 730 via cooling hole 710. The gas 440 then flows through the interior of the block 730 in a zig-zag fashion to cool the battery cells 110 and exits the block 730 via cooling hole 740.

It should be noted that the cooling holes 710, 740 in FIG. 7 are illustrated to be circular shaped cooling holes. However, in other embodiments, various different shapes other than a circular shape may be employed for cooling holes 710, 740 formed (or machined) on the block 730. Other shapes that the cooling holes 710, 740 may be formed to be include, but are not limited to, a rectangular shaped cooling hole (e.g., a slot), a square shaped cooling hole, and a triangular shaped cooling hole.

Figure 8:
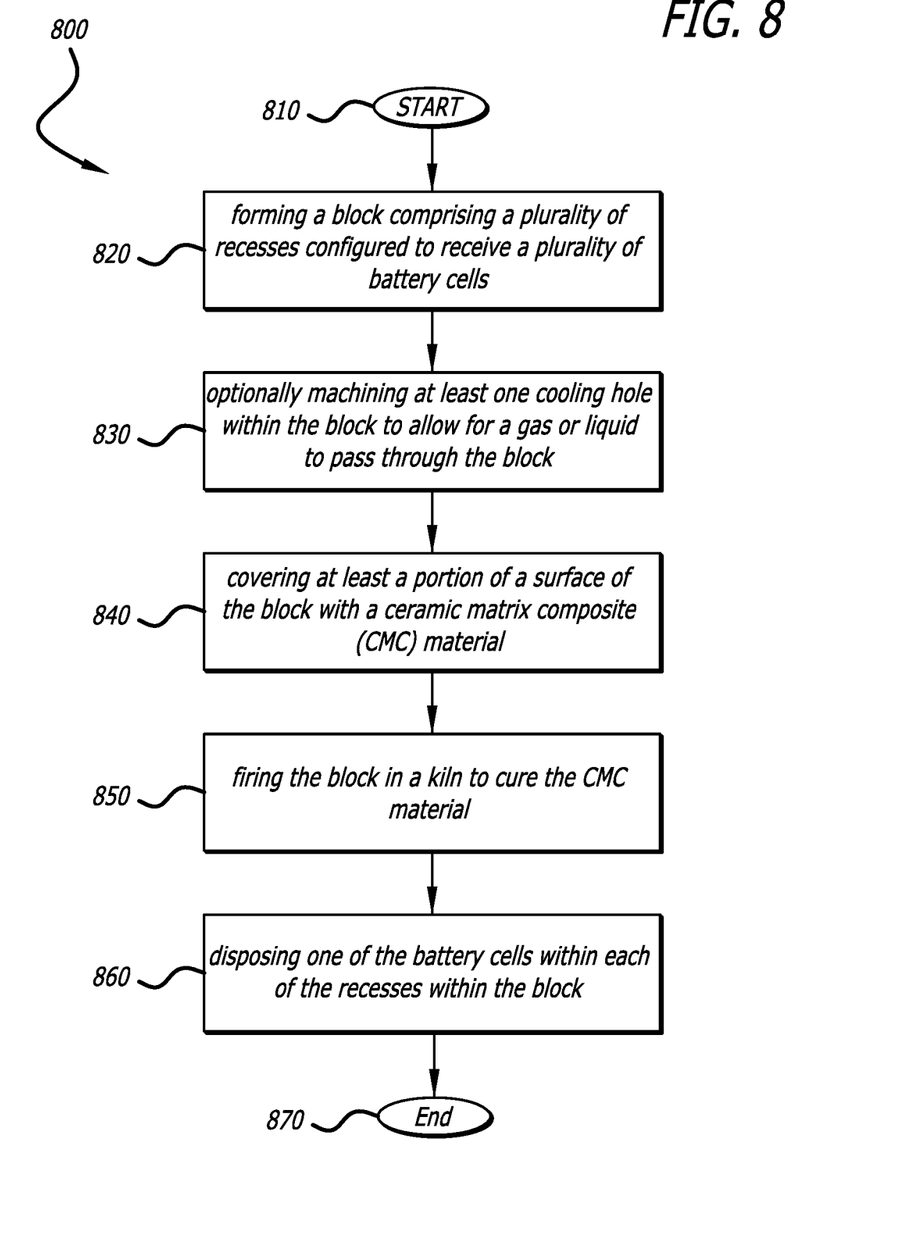
FIG. 8 is a flow chart showing a method of manufacturing the disclosed battery pack, in accordance with at least one embodiment of the present disclosure.

FIG. 8 is a flow chart showing a method 800 of manufacturing the disclosed battery pack, in accordance with at least one embodiment of the present disclosure. At the start 810 of the method 800, a block comprising a plurality of recesses configured to receive a plurality of battery cell is formed 820. During the forming of the block, the block is optionally formed to allow a gas or a liquid to pass (e.g., flow) in a predefined fashion (e.g., a zig-zag fashion) within the interior of the block. Also, at least one cooling hole is optionally machined within a side of the block to allow for a gas or liquid to pass (e.g., flow) through the interior of the block 830.

Then, at least a portion of the surface of the block is covered with a ceramic matrix composite (CMC) material 840. The block is then fired in a kiln to cure the CMC material 850. Then, a battery cell is disposed (e.g., inserted) within each of the recesses formed within the block 860. Then, the method 800 ends 870.

Figure 9:
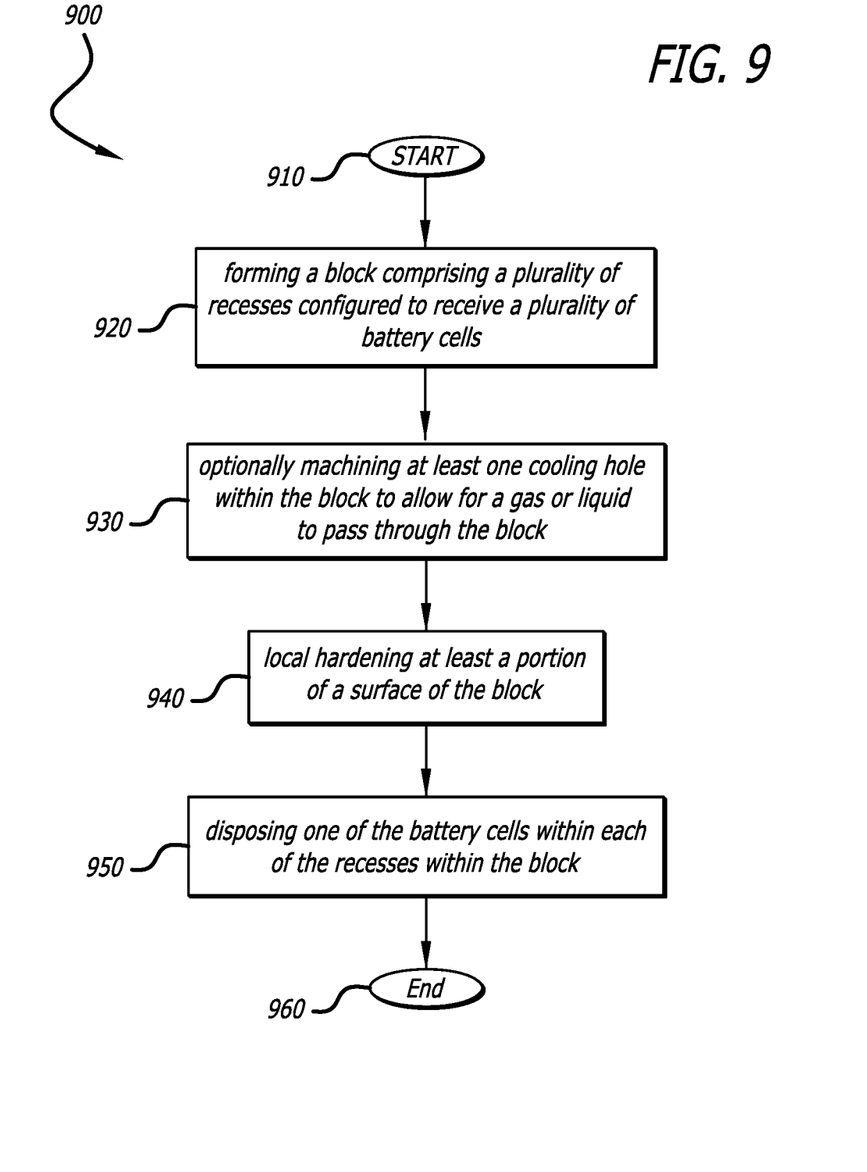
FIG. 9 is a flow chart showing another method of manufacturing the disclosed battery pack, in accordance with at least one embodiment of the present disclosure.

FIG. 9 is a flow chart showing another method 900 of manufacturing the disclosed battery pack, in accordance with at least one embodiment of the present disclosure. At the start 910 of the method 900, a block comprising a plurality of recesses configured to receive a plurality of battery cell is formed 920. During the forming of the block, the block is optionally formed to allow a gas or a liquid to pass (e.g., flow) in a predefined fashion (e.g., a zig-zag fashion) within the interior of the block. Also, at least one cooling hole is optionally machined within a side of the block to allow for a gas or liquid to pass (e.g., flow) through the interior of the block 930.

Then, at least a portion of the surface of the block is local hardened 940. Then, a battery cell is disposed (e.g., inserted) within each of the recesses formed within the block 950. Then, the method 900 ends 960.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

I claim:

1. A battery pack apparatus, the apparatus comprising:
a plurality of battery cells; and
a block comprising a plurality of recesses formed within the block, wherein each of the recesses respectively houses one of the battery cells within the block, and wherein the block comprises a low density ceramic fiber reinforced foam that is porous comprising open cells such that a gas or liquid may pass through the block via the open cells.

2. The apparatus of claim 1, wherein at least one of the battery cells is at least one of a lithium-ion battery cell, a nickel-cadmium battery cell, a nickel-zinc battery cell, or a nickel-metal hydride battery cell; and
the low density ceramic fiber reinforced foam comprises 95% to 98% air by volume.

3. The apparatus of claim 2, wherein the lithium-ion battery cell is a lithium cobalt oxide battery cell, a lithium manganese oxide battery cell, a lithium iron phosphate battery cell, a lithium nickel manganese cobalt oxide battery cell, a lithium nickel cobalt aluminum oxide battery cell, a lithium titanate battery cell, or a lithium-sulfur battery cell; and
the low density ceramic fiber reinforced foam has a density range of 8 to 30 pounds per cubic foot.

4. The apparatus of claim 1, wherein the low density ceramic fiber reinforced foam is a low density oxide ceramic fiber reinforced foam; and
the battery pack weighs 8 to 20 pounds per cubic foot.

5. The apparatus of claim 1, wherein the low density ceramic fiber reinforced foam comprises alumina-borosilicate.

6. The apparatus of claim 1, wherein at least a portion of a surface of the block is local hardened.

7. The apparatus of claim 1, wherein at least a portion of a surface of the block is covered with a ceramic matrix composite (CMC) material.

8. The apparatus of claim 7, wherein the ceramic matrix composite (CMC) material comprises a ceramic slurry composite pre-impregnated (prepreg) with fibers.

9. The apparatus of claim 7, wherein the ceramic matrix composite material (CMC) is cured via firing the block in a kiln.

10. The apparatus of claim 7, wherein an interior surface of at least one of the recesses of the block is coated with the ceramic matrix composite (CMC) material.

11. The apparatus of claim 1, wherein the block is configured to pass the gas or the liquid in a zig-zag fashion within an interior of the block.

12. The apparatus of claim 1, wherein at least one cooling hole is machined or formed within the block such that a gas or liquid may pass through the block via the at least one cooling hole.

13. A system for cooling a battery pack, the system comprising:
the battery pack comprising a plurality of battery cells and a block comprising a plurality of recesses formed within the block, wherein each of the recesses respectively houses one of the battery cells within the block, and wherein the block comprises a low density ceramic fiber reinforced foam that is porous comprising open cells such that a gas or liquid may pass through the block via the open cells, the low density ceramic fiber reinforced foam comprising 95% to 98% air by volume; and
a pump to pump the gas or the liquid through the block to cool the battery cells within the block.

14. The system of claim 13, wherein the pump is configured to pump the gas or the liquid into a face side or into an edge side of the block.

15. The system of claim 13, wherein the pump is configured to pump the gas or the liquid into at least one cooling hole, which is machined or formed within the block.

16. The system of claim 13, wherein the block is configured to allow the gas or the liquid pass in a zig-zag fashion within an interior of the block.

17. A method for cooling a battery pack, the method comprising:
pumping, via a pump, a gas or liquid through a block of the battery pack to cool a plurality of battery cells within the battery pack,
wherein a plurality of recesses is formed within the block, and each of the recesses respectively houses one of the battery cells within the block, and
wherein the block comprises a low density ceramic fiber reinforced foam that is porous comprising open cells such that the gas or the liquid may pass through the block via the open cells, the low density ceramic fiber reinforced foam comprising 95% to 98% air by volume, and the gas or liquid pass through the open cells to cool the battery cells.

18. A method of manufacturing a battery pack, the method comprising:
forming a block comprising a plurality of recesses configured to receive a plurality of battery cells, wherein the block comprises a low density ceramic fiber reinforced foam that is porous comprising open cells such that a gas or liquid may pass through the block via the open cells during use of the battery pack;
covering at least a portion of a surface of the block with a ceramic matrix composite (CMC) material;
firing the block in a kiln to cure the CMC material; and
disposing one of the battery cells within each of the recesses within the block.

19. The method of claim 18, wherein the method further comprises machining or
forming at least one cooling hole within the block to allow for the gas or liquid to pass through the block.

20. The method of claim 18, wherein the method further comprises forming the block such that the block is configured to pass the gas or the liquid in a zig-zag fashion within an interior of the block.

* * * * *